US007769269B2

(12) United States Patent
Kuch (10) Patent No.: US 7,769,269 B2
(45) Date of Patent: Aug. 3, 2010

(54) HIGH PERFORMANCE STORAGE DEVICE ACCESS FOR NON-LINEAR EDITING SYSTEMS (75) Inventor: James J. Kuch, Wheaton, IL (US)

(73) Assignees: Sony Corporation, Tokyo (JP); Sony Electronics, Inc., Parkridge, NJ (US)

( * ) Notice: Subject to any disclaimer, the term of this patent is extended or adjusted under 35 U.S.C. 154(b) by 1359 days.

(21) Appl. No.: 11/225,921

(22) Filed: Sep. 13, 2005

(65) Prior Publication Data
US 2006/0092776 A1 May 4, 2006

Related U.S. Application Data (60) Provisional application No. 60/624,940, filed on Nov. 3, 2004.

(51) Int. Cl.
H04N 5/93 (2006.01)
(52) U.S. Cl. ........................................................ 386/52
(58) Field of Classification Search ................... 386/52, 386/95, 125–126, 1, 46, 45
See application file for complete search history.

(56) References Cited

U.S. PATENT DOCUMENTS

| 5,465,120 | A | 11/1995 | Schultheiss |
| 6,023,720 | A | 2/2000 | Aref et al. |
| 6,154,600 | A | 11/2000 | Newman et al. |
| 6,370,316 | B1 * | 4/2002 | Yamada et al. ............. 386/46 |
| 6,504,990 | B1 * | 1/2003 | Abecassis ................. 386/46 |
| 6,591,057 | B2 | 7/2003 | Nagasawa |

* cited by examiner

Primary Examiner—Thai Tran
Assistant Examiner—Tat Chio
(74) Attorney, Agent, or Firm—Trellis IP Law Group, PC (57) ABSTRACT Disclosed are systems and methods for storage device access control initiated by a non-linear editor (NLE). In one embodiment, a storage device access controller can include: a storage device configured to store clips, such as audio, graphics, or video clips, arranged in frames; an NLE coupled to the storage device for requesting one or more of the clips; and a buffer engine coupled to the storage device and the NLE. The buffer engine can include: buffers for storing data from the storage device; a data index for indicating a location of data in a clip on the storage device; and a reader configured to control an access of the data using the data index in response to one or more parameters. Embodiments of the present invention can provide for improved data access performance from a disk where the data is requested in clip form from an NLE.

33 Claims, 10 Drawing Sheets

Figure 1 (conventional)

Figure 2 (conventional)

HIGH PERFORMANCE STORAGE DEVICE ACCESS FOR NON-LINEAR EDITING SYSTEMS

RELATED APPLICATIONS

This application claims the benefit of U.S. Provisional Application No. 60/624,940, filed Nov. 3, 2004, which is incorporated herein by reference in its entirety.

BACKGROUND

Non-linear editing (NLE) systems allow users to acquire video, graphics, and audio "clips," to manipulate them spatially and temporally, and to assemble them into a composite multimedia stream and/or file of data. This flexibility inherent in NLEs allows editors to create much of the content seen in theaters, on television, and on the Internet. Such editors can make complex edited sequences involving multiple layers with effects, such as fast and reverse motion video. However, such sequences can be especially demanding on the disk subsystem. Further, the disk subsystem demand is compounded by the use of High Definition (HD) video and multiple NLEs used in a networked environment.

Figure 1:
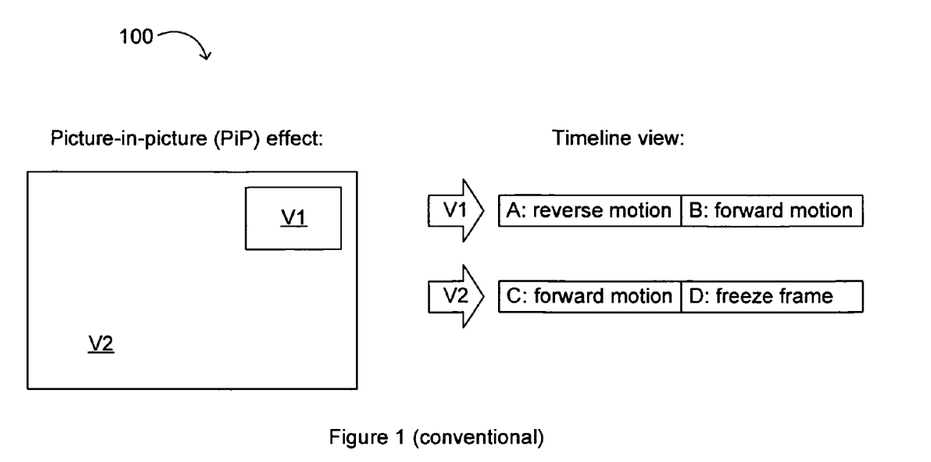
FIG. 1 is a conventional picture-in-picture (PiP) timeline example as edited within a non-linear editor (NLE)

Referring now to FIG. 1, a conventional picture-in-picture (PiP) timeline example as edited within a non-linear editor (NLE) is shown and indicated by the general reference character 100. A "timeline" is a spatial and temporal arrangement of video, audio, and/or graphics using an NLE. In the PiP effect view to the left of FIG. 1, a spatial arrangement of two video layers, V1 and V2, is shown. In the timeline view to the right of FIG. 1, each video layer is shown in a temporal arrangement as having two video "clips" or files ordered sequentially. A typical NLE allows the user to apply both spatial as well as temporal (e.g., motion) effects to each clip individually in the timeline. In this particular example, V1 is scaled to create the PiP effect. Also in this example, a reverse motion effect is applied to Clip A and a freeze frame effect is applied to Clip D. Editing of this sort can continue with multiple layers of any duration, including audio and graphics type clips.

While a timeline is being edited, the NLE may allow the video composition to be visualized or played back. Accordingly, the NLE typically must read video frames from the local disk array or storage area network (SAN) into a specialized hardware device's memory for further effects processing and/or outputting to external devices, such as a video monitor or tape deck.

Figure 2:
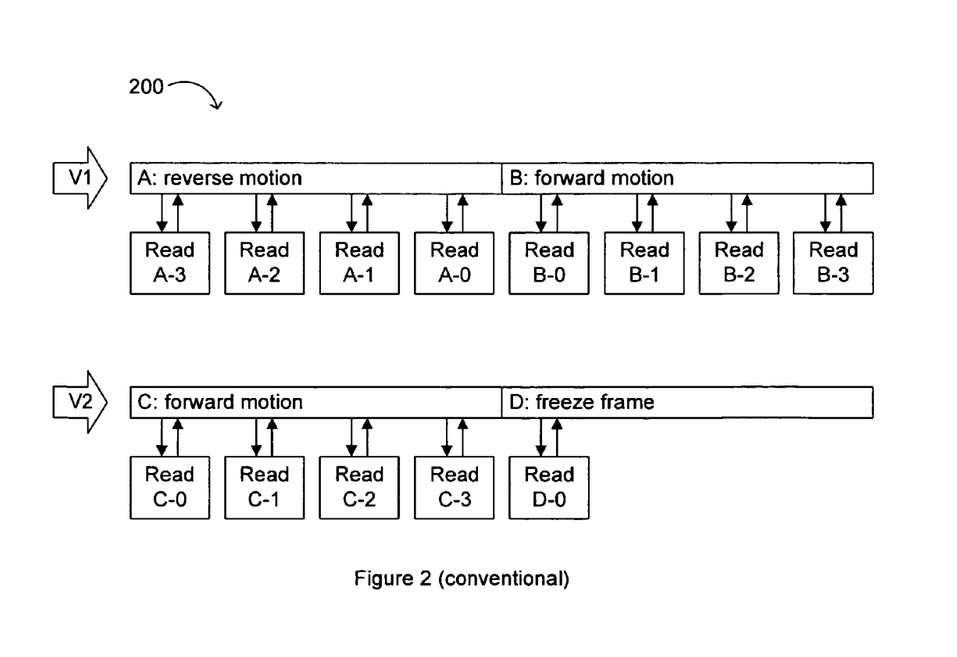
FIG. 2 is a conventional timeline and frame access example for the PiP example of FIG. 1.

Referring now to FIG. 2, a conventional timeline and frame access example for the PiP example of FIG. 1 is shown and indicated by the general reference character 200. In typical clip accessing from a disk, each frame is read as requested, consistent with the timeline, as requested by the NLE. Clip A's reverse motion can result in frame accesses: Read A-3, Read A-2, Read A-1, and Read A-0. Also, Clip B's forward motion can result in frame accesses: Read B-0, Read B-1, Read B-2, and Read B-3, and Clip C's forward motion can result in frame accesses: Read C-0, Read C-1, Read C-2, and Read C-3. Clip D's freeze frame can result in one frame access, Read D-0. Such excessive read patterns from a disk subsystem are not optimized.

It would be desirable to optimize the reads from a disk so that additional layers of video, audio, and graphics can be sent to the effects processing system for improved editing capabilities. Further, more NLE stations in a networked system can function on a SAN when disk throughput is configured optimally, thus increasing user productivity and decreasing overall system costs.

SUMMARY

In one embodiment, a storage device access controller can include: a storage device configured to store clips, such as audio, graphics, or video clips, arranged in frames; a non-linear editor (NLE) coupled to the storage device for requesting one or more of the clips; and a buffer engine coupled to the storage device and the NLE. The buffer engine can include: buffers for storing data from the storage device; a data index for indicating a location of data in a clip on the storage device; and a reader configured to control an access of the data using the data index in response to one or more parameters. The storage device can include a disk, for example.

In another embodiment, a buffer engine can be configured to optimize data access from a storage device when one or more clips are requested by an NLE. The buffer engine can include: buffers for storing data from the storage device; a data index for indicating a location of data in a clip on the storage device; and a reader configured to control the data access using the data index in response to one or more parameters.

In another embodiment, a method of translating a storage access request for a clip in a storage device can include: detecting a first request to retrieve the clip, where the clip has a plurality of frames; determining a location of frames in the clip on the storage device by accessing an index; forming a second request to retrieve the clip by merging two or more of the frames; and accessing the storage device according to the second request. The method may also include the step of determining an alignment of sectors for the frames.

Embodiments of the present invention can provide a system and method for improved data access performance from a disk where the data is requested in clip form from an NLE, for example.

DETAILED DESCRIPTION

In the drawings, well known storage device (e.g., disk), buffer, non-linear editor (NLE) and other system and/or system component elements are omitted so as to more clearly illustrate embodiments of the invention. Like-numbered elements shown in two or more drawings illustrate the same or substantially similar elements.

Figure 3:
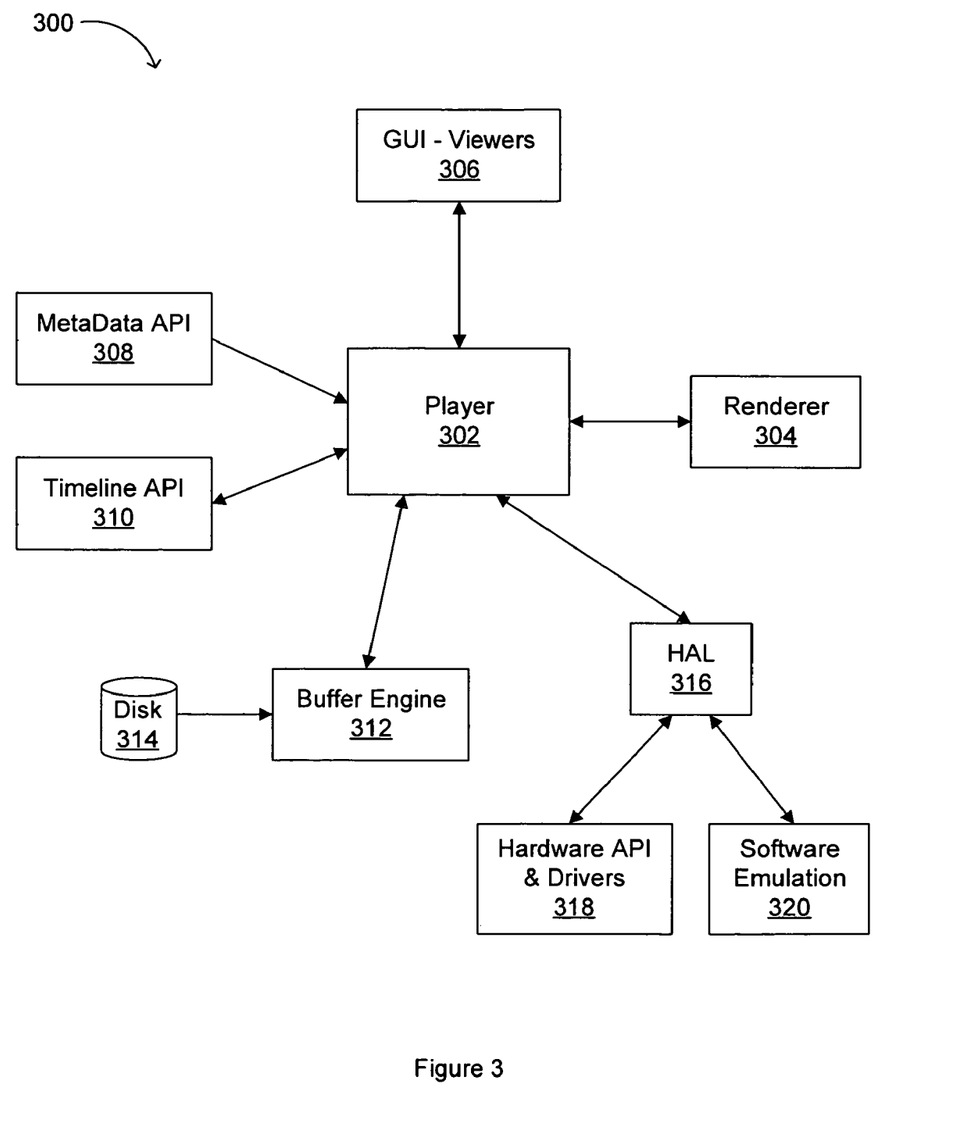
FIG. 3 is a block diagram of an NLE system suitable for use in accordance with embodiments of the present invention.

Referring now to FIG. 3, a block diagram of an NLE system suitable for use in accordance with embodiments of the present invention is shown and indicated by the general reference character 300. For example, most of the components of an NLE, such as hardware devices and/or software modules, are shown in FIG. 3. Player 302 can interface with Graphical User Interface (GUI)—Viewers 306 and Renderer 304. Player 302 may be an NLE or a portion of an NLE, for example. Developers can write code to MetaData Application Programming Interface (API) 308 and timeline API 310. Hardware Abstraction Layer (HAL) 316 can provide a uniform interface to control possibly different hardware and may interface to hardware API & drivers 318 and software emulation 320. Buffer engine 312 may receive clips in the form of frames or data from disk 314.

Disk 314 may be a single disk or an array of disks, for example. Alternatively, disk 314 may be any storage device, including networked storage devices, such as a storage area network (SAN). Further, disk 314 may be a fast array type of disk or any relatively slow access type of storage medium. According to embodiments of the present invention, software may be adapted to optimize a read throughput from such a storage medium, thereby largely minimizing or eliminating any performance effects due to having a relatively slow storage medium.

Figure 4:
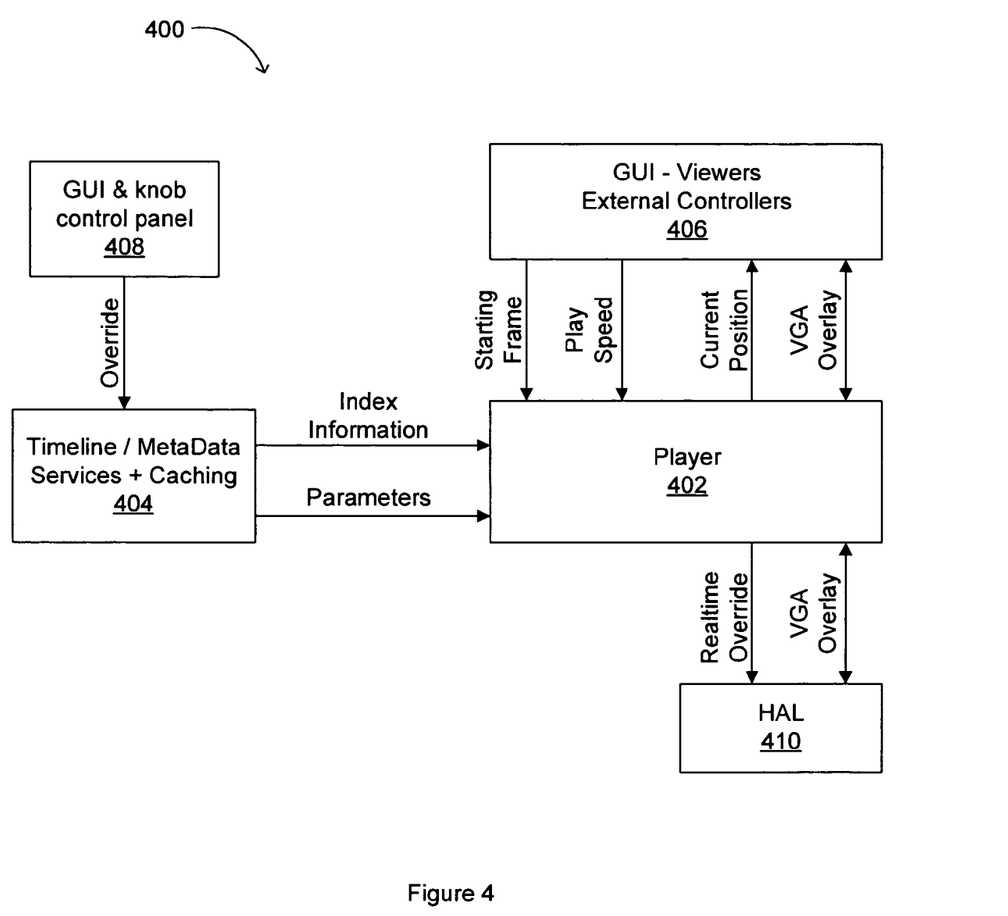
FIG. 4 is a block diagram of an NLE system index information and parameter integration in accordance with embodiments of the present invention.

Referring now to FIG. 4, a block diagram of an NLE system index information and parameter integration in accordance with embodiments of the present invention is shown and indicated by the general reference character 400. FIG. 4 may represent a subset of the NLE system shown above in FIG. 3, for example. GUI—viewers external controllers 406 can provide information, such as a starting frame and a play speed to player 402, as well as interface video graphics array (VGA) overlay information. A current frame position can be conveyed from player 402 to GUI—viewers external controllers 406. HAL 410 can receive realtime override control from player 402 and can also interface VGA overlay information. GUI & knob control panel 408 can provide override control to timeline/metadata services and caching 404. Player 402 can receive index information and parameters from timeline/metadata services and caching 404. The index information can tell player 402 where each requested frame is located on an associated disk. The parameters are tunable and can be provided to player 402 to control or further optimize reads from the disk, as will be discussed in more detail below.

Figure 5:
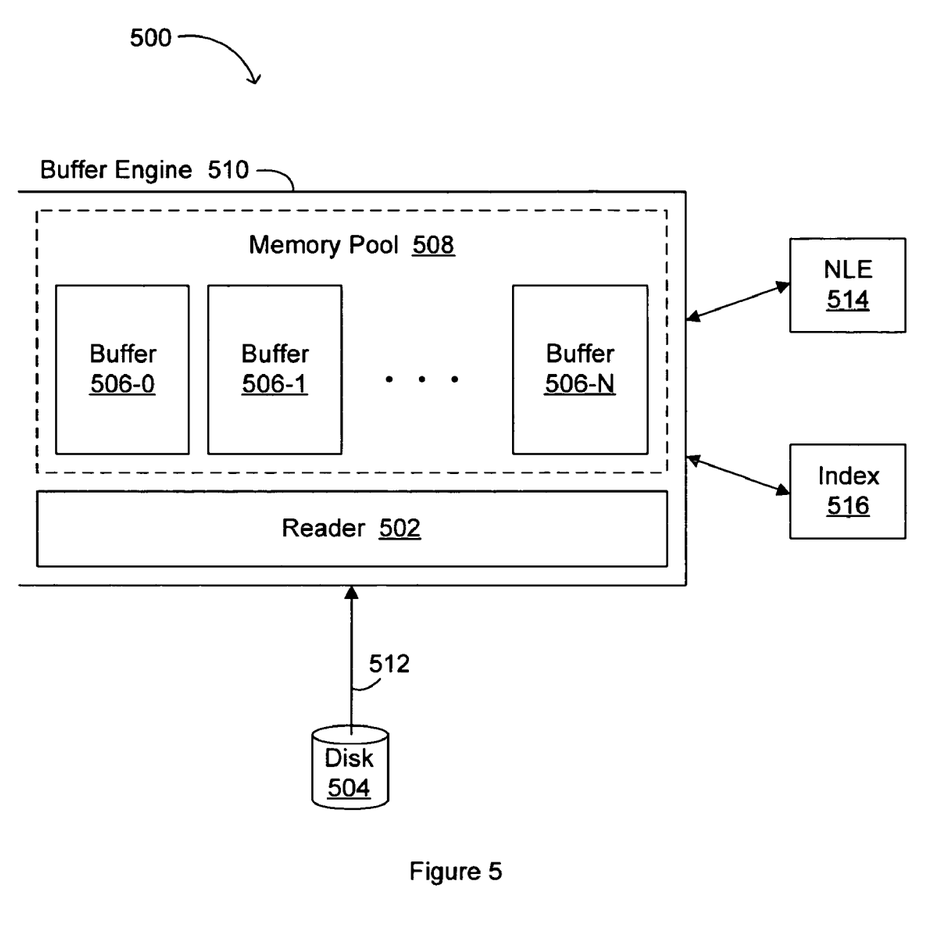
FIG. 5 is a block diagram of a buffer engine and an interface to an NLE and index store in accordance with an embodiment of the present invention.

Referring now to FIG. 5, a block diagram of a buffer engine and an interface to an NLE and index store in accordance with an embodiment of the present invention is shown and indicated by the general reference character 500. Buffer engine 510 can include reader 502 and memory pool 508. Memory pool 508 can be any type of random-access memory (RAM) or other suitable storage medium. Memory pool 508 can be broken up or configured into buffers, such as buffers 506-0, 506-1, ... buffer 506-N. This buffer configuration (e.g., buffer size and number of buffers) is one of the tunable parameters that allow for optimization of reads (e.g., optimized disk throughput) from disk 504 via path 512. In one implementation, the number of buffers can be up to 32 and the buffer size can range from 584 KB to 16 MB.

NLE 514 and index store 516 may interface with buffer engine 510. NLE 514 can provide requests to retrieve clips of data from storage device or disk 504, for example. Index store 516 can provide index information to buffer engine 510. This index information can include locations of frames on disk 504, for example. In some embodiments, index store 516 may be included within buffer engine 510. Further, data index or index information from index store 516 may be any suitable form of location identification, such as a pointer or a table of locations.

Disk queuing may be done using memory pool 508 (buffers 506-0, 506-1, ... buffer 506-N) and reader 502. Buffer engine 510 can queue frames of video, audio, and/or graphics based on timeline data and playback position using the group of buffers in memory pool 508. Buffers 506-0, 506-1, ... buffer 506-N can control how and where blocks of data from disk 504 can be queued for optimal performance. Memory pool 508 can manage a list of read requests, including the ability to back map data reads into memory based on the original file, offset into the file, and the size of the request. Index and tunable parameter information (as shown in FIG. 4) can be used to facilitate the disk read control. Generally, as read requests (e.g., from an NLE) are queued-up, memory pool 508 may act to sort the requests based on file and file offset in ascending order, for example. Requests may be grouped together based on the tunable parameters to achieve optimal performance. Reader 502 can then be used to initiate a read access from disk 504 and may receive the data via path 512 once a portion of memory pool 508 assigned to a particular buffer (e.g., 506-0, 506-1, ... 506-N) is queued-up full.

Buffers 506-0, 506-1, ... buffer 506-N can be used in a double-buffering or other suitable scheme whereby while data is being displayed from one buffer, another buffer can be receiving data from disk 504 via path 512, for example. As the number of buffers 506-0, 506-1, ... buffer 506-N is increased, more data can be effectively cached going forward (for forward play) or reverse (for reverse motion effect). In one embodiment, a serial scheme can be employed whereby buffer 506-0 can provide data for display while buffer 506-1 receives data from disk 504 via path 512, for example. This can be reversed for reverse playback and, in some applications, old data read in to a buffer may be re-used during a reverse motion effect situation.

Figure 6:
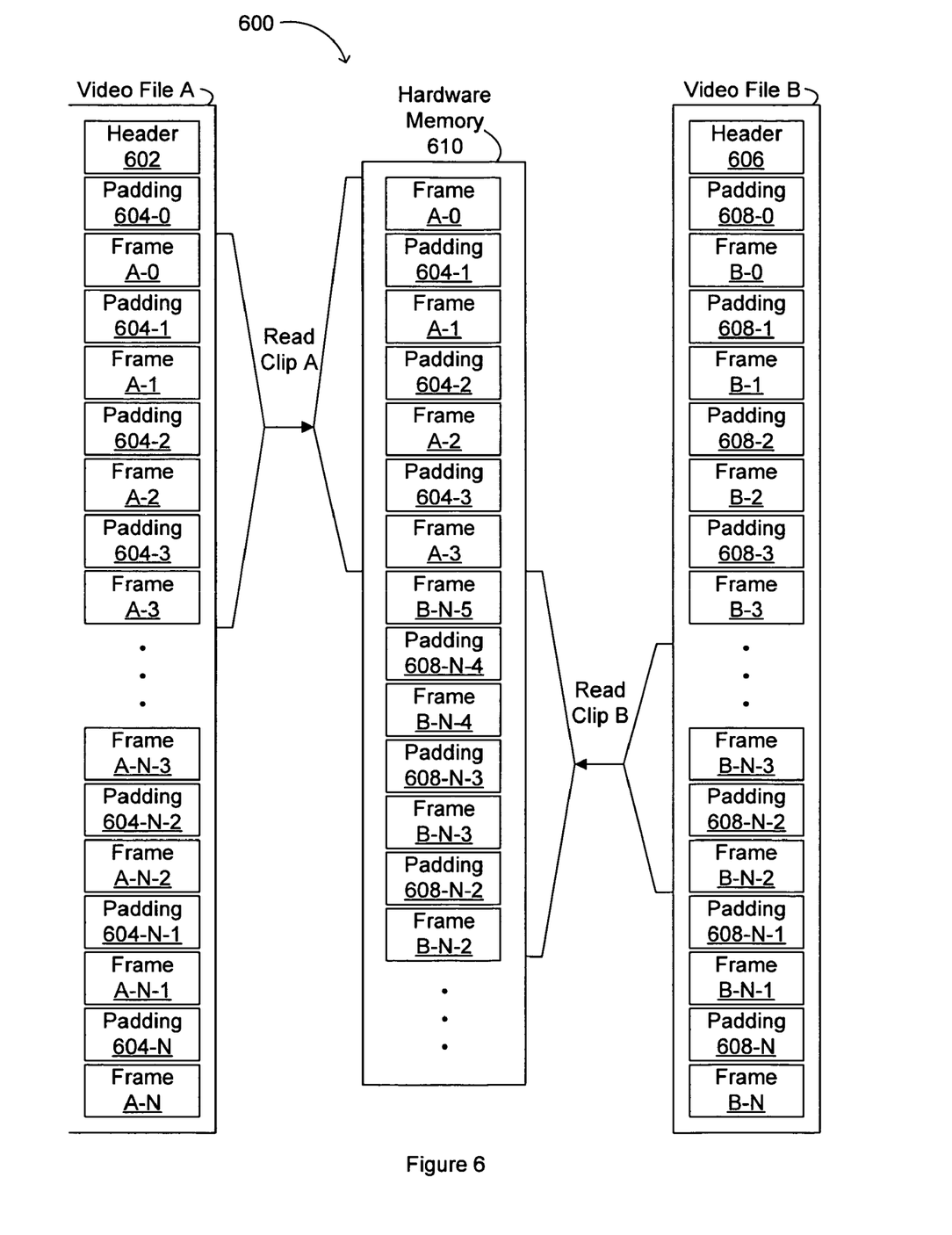
FIG. 6 is a timeline example for data access in accordance with embodiments of the present invention.

Referring now to FIG. 6, a timeline example for data access in accordance with embodiments of the present invention is shown and indicated by the general reference character 600.

Video file A can include header 602, padding 604-0, 604-1, 604-2, 604-3, . . . padding 604-N-2, 604-N-1, 604-N, and frames A-0, A-1, A-2, A-3, . . . frame A-N-3, A-N-2, A-N-1, A-N. The padding may be simple padding, metadata, or audio data for interleaved media files, for example. Video file B can include header 606, padding 608-0, 608-1, 608-2, 608-3, . . . padding 608-N-2, 608-N-1, 608-N, and frames B-0, B-1, B-2, B-3, . . . frame B-N-3, B-N-2, B-N-1, B-N. In the associated timelines (not shown), Clip A (4 frames) can be followed by Clip B (4 frames). Accordingly, the timeline may be queued for playback by reading in the 4 frames from each of Clip A and Clip B.

According to embodiments, an optimized read of a clip can include a grouping of two or more frames into one disk access or read. As shown for contiguous reads, a read of Clip A can place data frame A-0, padding 604-1, frame A-1, padding 604-2, frame A-2, padding 604-3, and frame A-3 into hardware memory 610. Following this read of Clip A, a read of Clip B can place data frame B-N-5, padding 608-N-4, frame B-N-4, padding 608-N-3, frame B-N-3, padding 608-N-2, and frame B-N-2 into hardware memory 610. Further, while some extra or unused data (e.g., padding) may be read into buffers in addition to the requested frames of data as shown, this effect may generally be offset by the increased disk throughput.

Figure 7:
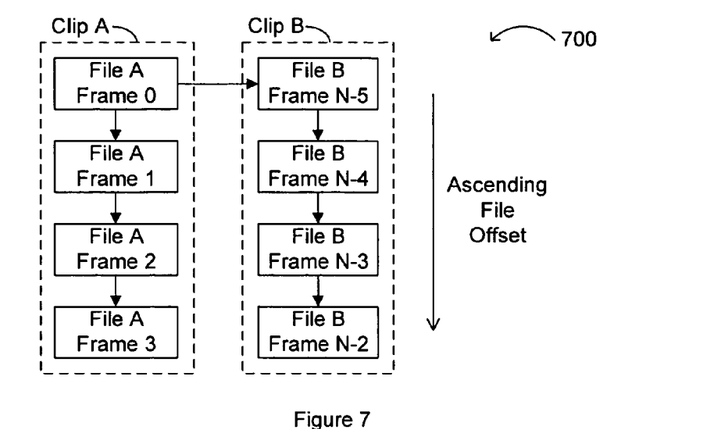
FIG. 7 is a timeline example showing frames queued but not yet merged in accordance with embodiments of the present invention.

Referring now to FIG. 7, a timeline example showing frames queued but not yet merged in accordance with embodiments of the present invention is indicated by the general reference character 700. This example shows a possible final list of queued frames for optimized disk reads for the example of FIG. 6. The frames may be queued in ascending order based on file offset and on a per-file basis, for example. During the queuing process, frame requests may first be sector-aligned. The sector-aligning is also a tunable or configurable parameter, according to embodiments, and will be discussed further below.

Figure 8:
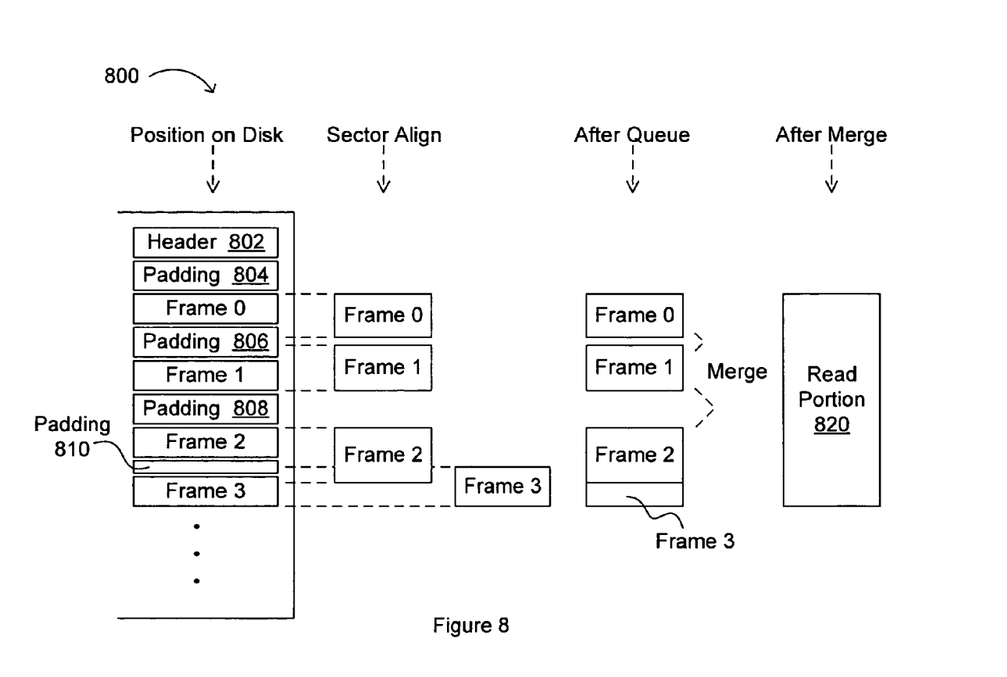
FIG. 8 is a block diagram example showing multiple video frame queuing in accordance with an embodiment of the present invention.

Referring now to FIG. 8, a block diagram example showing multiple video frame queuing in accordance with an embodiment of the present invention is indicated by the general reference character 800. The positions on the disk can include header 802, padding 804, frame 0, padding 806, frame 1, padding 808, frame 2, padding 810, frame 3, etc. Any requests of non-contiguous frames or data can be merged into one request based on a tunable parameter designating the merge distance, or how far apart the frame locations can be for a merge to occur. This parameter can essentially control a tradeoff between seeking and making another read versus making one large and contiguous read at the expense of using additional buffer space (e.g., some additional data read in by such a larger read may not be passed on to an associated NLE because the NLE did not request this additional data). Among the considerations for application of the merge distance parameter are the seek performance of the disk as well as the amount of buffer memory available. In the example of FIG. 8, all four of frames 0-3 are merged into one large read portion 820, as opposed to making three or four smaller reads. Further, while some extra or unused data may be read into buffers as part of the larger read portion 820, this effect may generally be offset by the increased disk throughput.

Generally, the sector aligning may be done to accommodate requirements of the storage medium or disk used. For example, the disk subsystem may be divided into sectors, which are effectively the smallest physical storage units on the disk. Accordingly, for a 256B or 512B sector size, sector alignment would require alignment to the 256B or 512B addressable boundary, respectively. In practice, the range of data to be accessed is shifted or extended forward or backward in order to reach an appropriate sector boundary.

Figure 9:
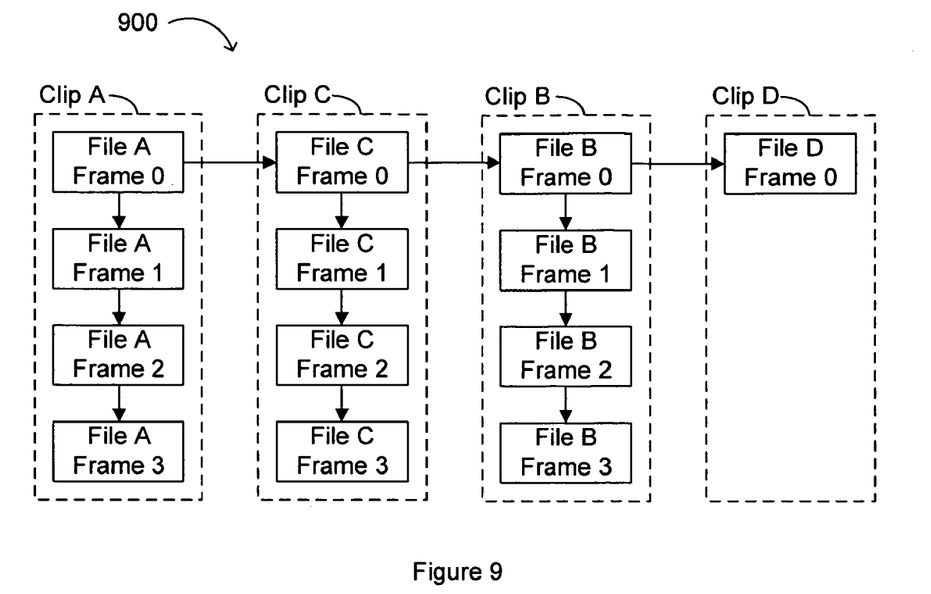
FIG. 9 is a timeline example diagram showing PiP queuing with motion effects on Clip A and Clip D in accordance with an embodiment of the present invention.

Referring now to FIG. 9, a timeline example diagram showing PiP queuing with motion effects on Clip A and Clip D in accordance with an embodiment of the present invention is indicated by the general reference character. 900. This example shows a queued list of frames prior to merging and follows the example shown above in FIG. 2. Once merged, however, larger and more optimal disk reads can increase disk throughput relative to the multiple frame accesses shown in FIG. 2. In FIG. 9, Clip A, having a reverse motion effect, may still be sorted in ascending file offset even though Clip A may be queued by the buffer engine (e.g., buffer engine 510 of FIG. 5) in reverse frame order. Accordingly, Clip A's frames may be read from the disk in the same fashion as Clip C's frames, which has no applied motion effect in this particular example. Also, only one frame from Clip D is queued since it has an applied freeze frame effect in this particular example. Because the same frame is shown throughout for Clip D, there is no need to repeatedly read from the disk the same frame for the duration of the clip. As discussed above, the merge distance parameter can be used to set a data size limit on disk reads.

Once frames are queued and merged by buffer engine 510 (see FIG. 5), the data can then be read into memory pool 508 (e.g., buffers 506-0, 506-1, . . . buffer 506-N) by reader 502. In general, reader 502 may be data type independent by substantially using file handle, file offset, and request size information for reads from the disk. As the request list is traversed, disk I/O calls may be made based on tunable parameters, such as a factor configured for more uniform read sizes and a factor configured to control absorption of a smaller read portion into a larger read portion, so as to avoid small residual piece reads.

Figure 10:
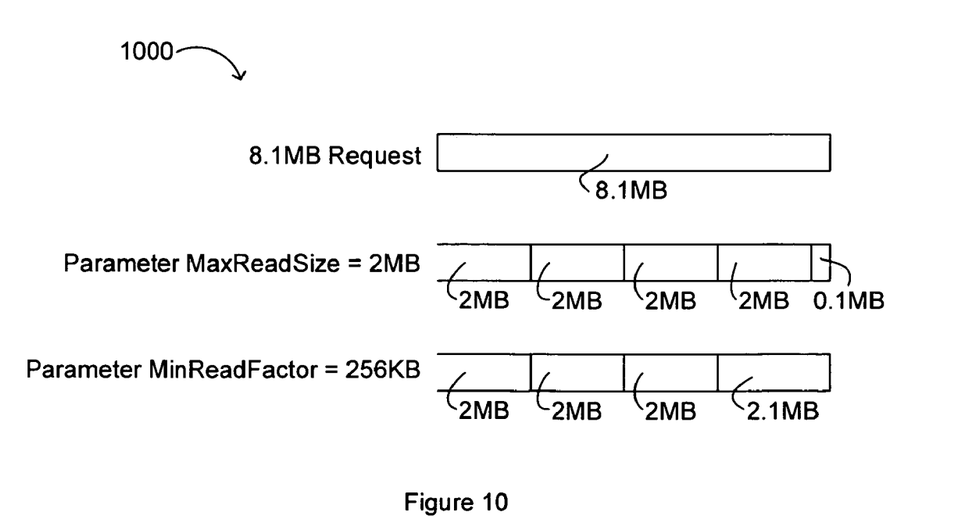
FIG. 10 is a diagram showing exemplary read size parameter adjustment options in accordance with embodiments of the present invention.

Referring now to FIG. 10, a diagram showing exemplary read size parameter adjustment options in accordance with embodiments of the present invention is indicated by the general reference character 1000. An 8.1 MB request read portion is shown in the top of diagram 1000. If the factor configured for more uniform read sizes (e.g., MaxReadSize) is set at 2 MB, the read can be broken-up as shown in the middle of diagram 1000 and four 2 MB reads can be made followed by a smaller 0.1 MB residual piece read, for example. If the factor configured to control absorption of a smaller read portion into a larger read portion (e.g., MinReadFactor) is set at 256 KB, the read can be arranged as shown in the bottom of diagram 1000, whereby the 0.1 MB portion is "absorbed" or combined with the nearest 2 MB data portion and three 2 MB reads can be made followed by one 2.1 MB read, for example.

In effect, MaxReadSize can control the largest disk I/O request to be made. Accordingly, if the total request size is larger than MaxReadSize, the request can be broken into MaxReadSize blocks and disk I/O requests can be made for that size. If the original request is not a multiple of MaxReadSize, a residual amount of data may be left, such as the 0.1 MB portion shown in the middle of diagram 1000. To prevent having such relatively small blocks of residual data, MinReadFactor can be used to regroup this residual data, as shown in the bottom of diagram 1000.

Accordingly, reader 502 may be able to break-up requests that were previously merged in buffer engine 510. This can be beneficial to disk throughput because of the sizes of individual requests commonly encountered in NLE applications. For example, a frame of video for a high-density camera (HDCAM) application may be 584 KB or a frame of audio may be 3202 B for one channel of 48 KHz, but it is more optimal to group such frame sizes into portions more suitable for disk access, such as 512 KB, 1 MB, etc. As will be discussed in more detail below, such post-merge breaking can be beneficial to overall disk throughput.

Another tunable or user-controllable parameter is the number of buffers (e.g., buffers 506-0, 506-1, . . . buffer 506-N of FIG. 5). Generally, the size of memory pool 508 is constrained by system costs and/or available system or integrated circuit (IC) space for such memory. However, the configuration of memory pool 508 into buffers may typically be altered. According to embodiments, at least two buffers may be allocated to allow for double-buffering and, in this case, the largest available buffers can be formed. At the other extreme, the smallest buffer size available may be one frame size since a frame is the smallest unit queued by buffer engine 510, according to embodiments.

Several test implementations were performed in accordance with embodiments of the present invention. The tests included changing the number of buffers and the MaxReadSize parameter, as discussed above. The tests were performed on a Sony XPRI® NLE workstation with one fiber channel disk array using HDCAM video files.

Figure 11:
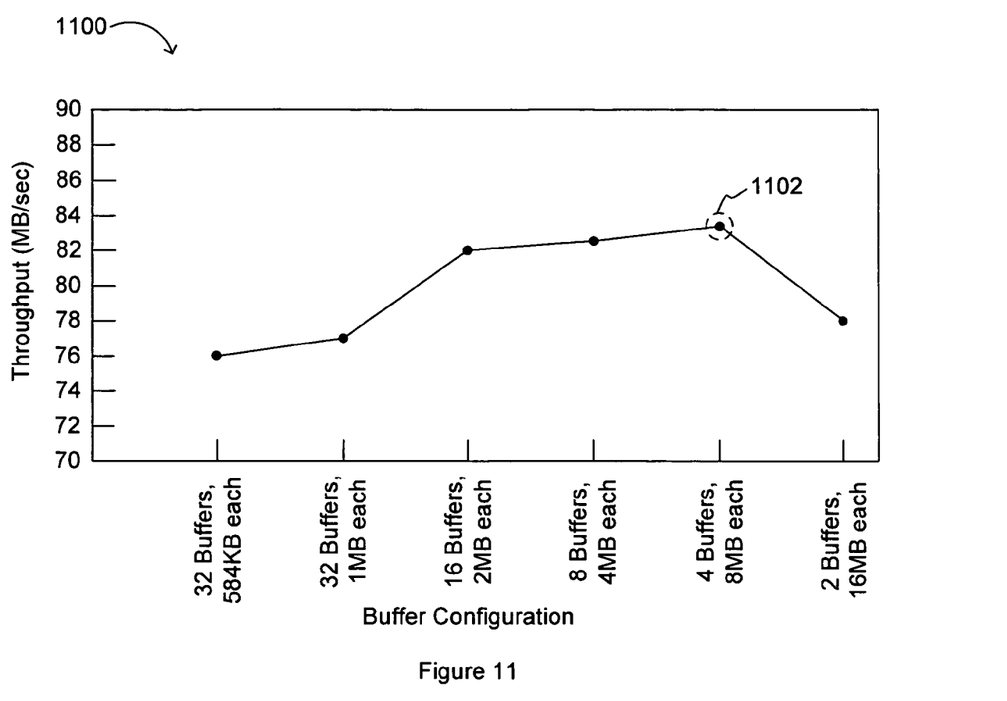
FIG. 11 is a buffer configuration parameter tuning plot for video playing with no motion effect (normal playback) for an implementation in accordance with embodiments of the present invention.

Referring now to FIG. 11, a buffer configuration parameter tuning plot for video playing with no motion effect (i.e., normal playback) for an implementation in accordance with embodiments of the present invention is shown and indicated by the general reference character 1100. In this implementation, the MaxReadSize was set larger than the buffer size to ensure that no requests were broken-up in the reader module. In FIG. 11, a steady increase in disk performance as the buffer size was increased was seen until four 8 MB buffers were used (see point 1102). Here, about a 9% improvement was seen over the single frame reading case. Also, these results were obtained during sustained playback of a video file, so the time between disk requests of an 8 MB buffer is half that of a 16 MB buffer. An 8 MB buffer has half the capacity of a 16 MB buffer, so half of the number of frames may be stored in an 8 MB buffer, meaning the buffers have to load twice as often in order to play for the same duration.

Figure 12:
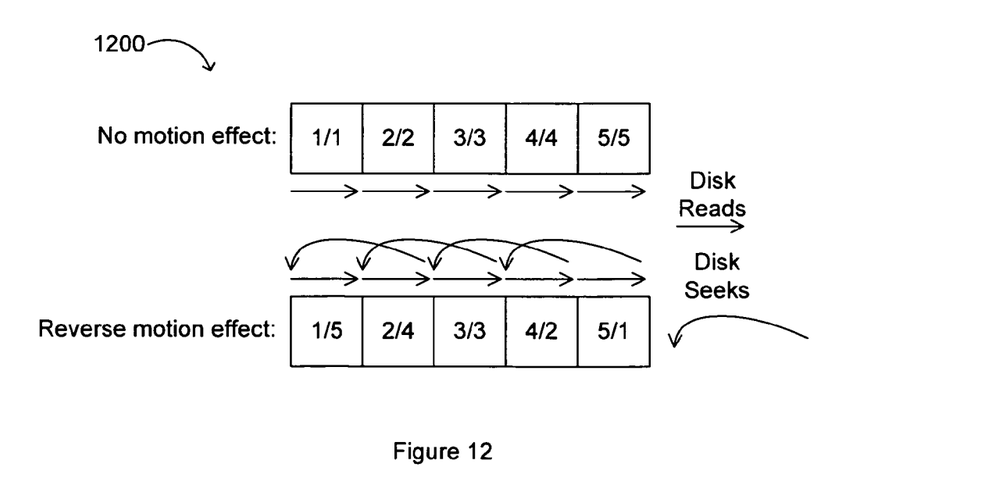
FIG. 12 is a disk read and seek illustration for a video clip suitable for analysis of embodiments of the present invention.

Playing a video file in reverse generally requires reading from near the end of the file, seeking back toward the beginning of the file to earlier frames and reading again. Referring now to FIG. 12, a disk read and seek illustration for a video clip suitable for analysis of embodiments of the present invention is indicated by the general reference character 1200. The additional seeking involved when reading single frames from a video file is shown. The first number in each box represents the frame number in the file and the second number represents a play out of order. Accordingly, for the no motion effect case, disk reads are for frames 1 through 5 with a play in order. For the reverse motion effect, the disk reads are still for frames 1 through 5, but the play order is reversed and there is a need to seek back twice as far during the reverse motion effect. When buffers are small, excessive seeking combined with small reads can cause performance to degrade greatly. Accordingly, embodiments of the present invention allow for tunable parameters to also optimize for reverse motion video effects.

Figure 13:
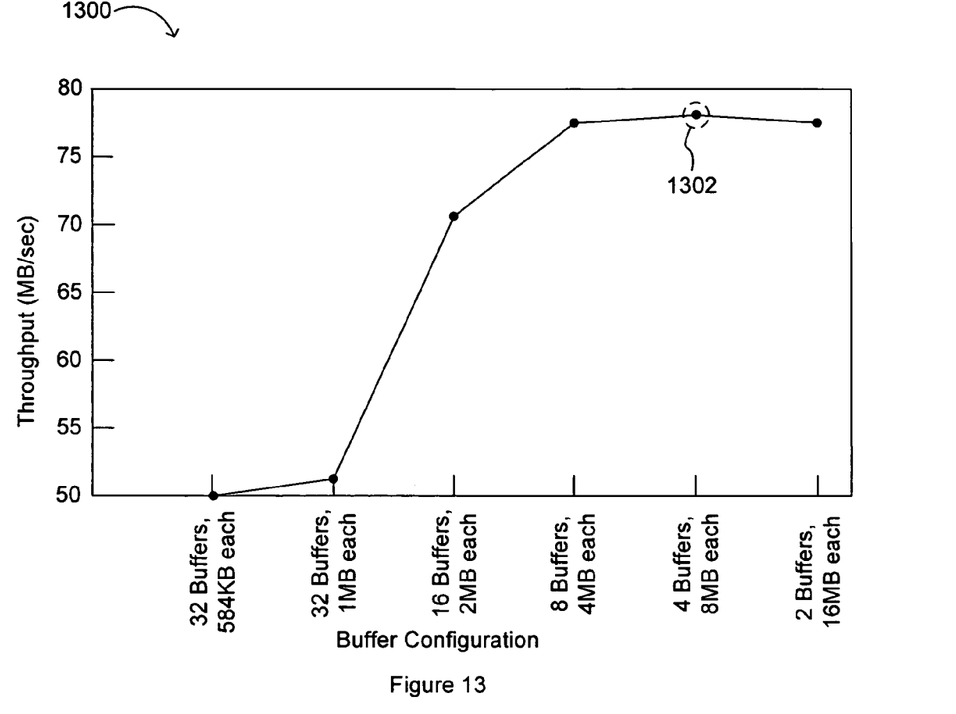
FIG. 13 is a buffer configuration parameter tuning plot for video playing with a reverse motion effect for an implementation in accordance with embodiments of the present invention.

Referring now to FIG. 13, a buffer configuration parameter tuning plot for video playing with a reverse motion effect for an implementation in accordance with embodiments of the present invention is shown and indicated by the general reference character 1300. Also in this implementation, the MaxReadSize was set larger than the buffer size to ensure that no requests were broken-up in the reader module. The results seen in this test are more dramatic than those of the forward motion test shown in FIG. 11. In FIG. 13, a peak performance point is found at 1302, also for the case of four 8 MB buffers.

Figure 14:
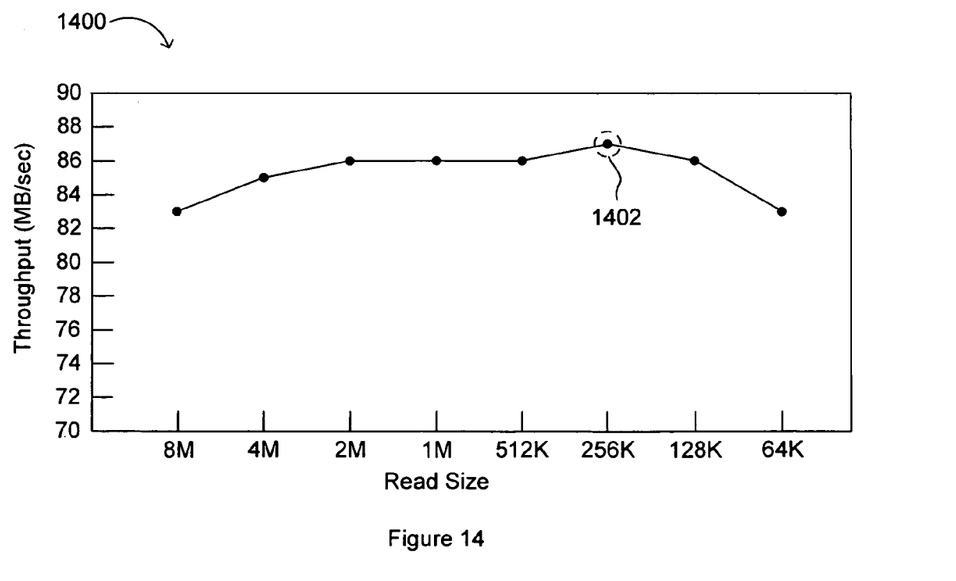
FIG. 14 is a read size parameter tuning plot using a configuration of 4 buffers of 8 MB each for an implementation in accordance with embodiments of the present invention.

Referring now to FIG. 14, a read size parameter tuning plot using a configuration of 4 buffers of 8 MB each for an implementation in accordance with embodiments of the present invention is shown and indicated by the general reference character 1400. In this implementation, the optimal buffer configuration found in the previous tests was used while varying the MaxReadSize. A peak performance point labeled 1402 was found for 256 KB read sizes into an 8 MB buffer.

Figure 15:
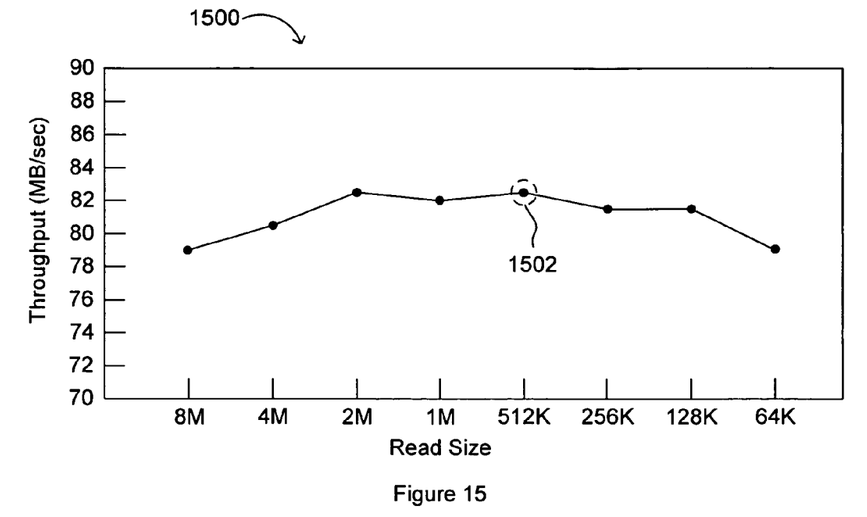
FIG. 15 is a read size parameter tuning plot using a configuration of 4 buffers of 8 MB each for reverse motion video for an implementation in accordance with embodiments of the present invention.

Referring now to FIG. 15, a read size parameter tuning plot using a configuration of 4 buffers of 8 MB each for reverse motion video for an implementation in accordance with embodiments of the present invention is shown and indicated by the general reference character 1500. Also in this implementation, the optimal buffer configuration found in the previous tests was used while varying the MaxReadSize. A peak performance point labeled 1502 was found for 512 KB read sizes into an 8 MB buffer. A total throughput increase of over 13% was found.

Figure 16:
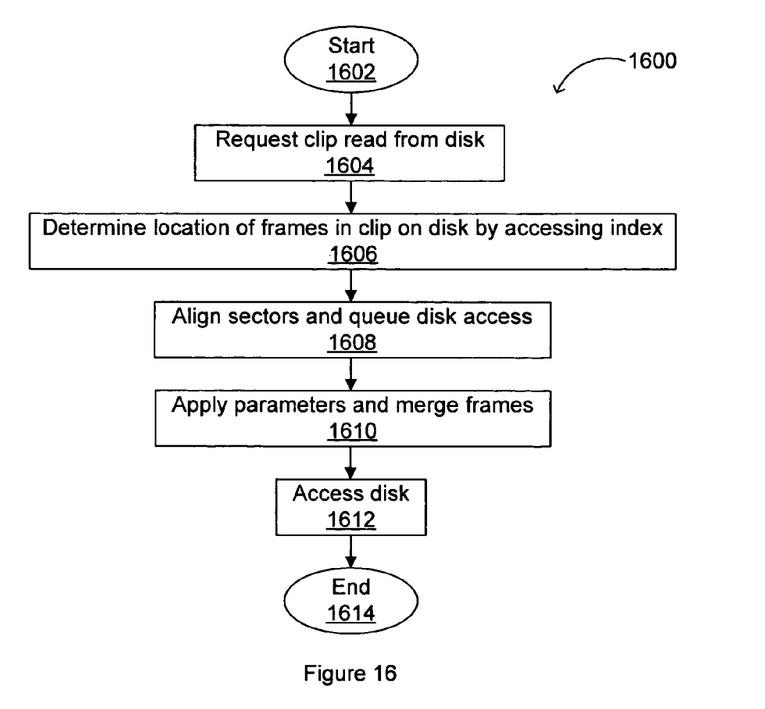
FIG. 16 is a flow diagram showing an exemplary method of controlling a disk access in accordance with embodiments of the present invention.

Referring now to FIG. 16, a flow diagram showing an exemplary method of controlling a disk access in accordance with embodiments of the present invention is indicated by the general reference character 1600. The flow can begin (1602) and a request for a clip read from a disk can be made (1604), for example, by an NLE. Next, locations of frames in the clip on the disk can be determined by accessing an associated index (1606). Next, sectors may be aligned and the disk access may be queued (1608) in the buffer engine. Next, parameters may be applied and frames may be merged (1610). The disk can then be accessed (1612) in a fashion substantially optimized for disk throughput and the flow can complete (1614).

While the specific implementation and examples discussed above shows specific optimal parameter values, this will vary from one system arrangement to another. Thus, embodiments of the present invention allow for tunable parameters so that each particular application can be optimized. SANs and other storage devices can relatively easily be optimized using a set of parameters specifically tuned for each device type. Further, such a disk buffering system can be employed in other products and/or environments based on the file handling and file offset based system approach described herein.

Accordingly, embodiments of the present invention allow for optimization of a storage device read throughput, particularly for an NLE requesting data from a disk subsystem. Further, particular embodiments provide tunable parameters so that the user can optimize for a particular system, product, environment, application, or the like.

Although the invention has been described with respect to specific embodiments thereof, these embodiments are merely illustrative, and not restrictive, of the invention. For example, various other configurations are possible, such as automatic parameter selection instead of user-tuned parameters, for example. In such an alternate automatic parameter selection embodiment, the tool may utilize internal performance tracking features of the disk buffer system. The tool may then cycle through a series of tests while automatically adjusting the tunable parameters to arrive at the optimal set for a particular disk subsystem, for example.

Aspects of the invention may be realized on different size scales and/or configurations than those presented herein. Although exemplary memory pool and buffer sizes and configurations have primarily been presented, other technologies, such as macro, nano or other designs, sizes and/or fabrication techniques may be used to advantage in different embodiments. Further, while disk subsystems and buffering have been primarily presented herein, any type of storage medium, including networked storage devices, could also be used in accordance with embodiments. Also, while data index information is shown as stored in a separate index store, this information may be included in the buffer engine itself. Further, such index information can be any type of location identification, such as pointers, tables, or any other suitable data location identification mechanism.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances; well-known structures, materials, or operations are not specifically shown or described in detail to avoid obscuring aspects of embodiments of the present invention.

Any suitable programming language can be used to implement the routines of embodiments of the present invention, including C, C++, Java, assembly language, etc. Different programming techniques can be employed, such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at substantially the same time. In addition, the sequence of operations described herein can be interrupted, suspended, or otherwise controlled by another process, such as an operating system, kernel, etc. The routines can operate in an operating system environment or as stand-alone routines occupying all, or a substantial part, of the system processing.

A "computer-readable medium" for purposes of embodiments of the present invention may be any medium that can contain and store the program for use by or in connection with the instruction execution system, apparatus, system or device. The computer-readable medium can be, by way of example only but not by limitation, an electronic, magnetic, optical, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits (ASICs), programmable logic devices (PLDs), field programmable gate arrays (FPGAs), optical, chemical, biological, quantum or nanoengineered systems, components and mechanisms may be used. In general, the functions of the present invention can be achieved by any means as is known in the art. Distributed, networked systems, and/or components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A storage device access controller, comprising:
a storage device configured to store a plurality of clips arranged in frames;
a non-linear editor (NLE) coupled to the storage device, the NLE being configured to request one or more of the plurality of clips; and
a buffer engine coupled to the storage device and the NLE, the buffer engine being configured by one or more tunable parameters to optimize accesses from the storage device, the buffer engine having:
a plurality of buffers configured to store data retrieved from the storage device in response to the request from the NLE, wherein at least one of the tunable parameters is used to arrange the plurality of buffers;
a data index for indicating a location of data in a clip on the storage device; and
a reader configured to control an access of the data from the storage device using the data index in response to at least one of the tunable parameters, wherein the at least one tunable parameter includes a factor to control absorption of a smaller read portion into a larger read portion by defining a minimum data size such that the smaller read portion is absorbed into the larger read portion for the data access when the minimum data size is greater than the smaller read portion.

2. The storage device access controller of claim 1, wherein the storage device includes a disk.

3. The storage device access controller of claim 1, wherein the data index is stored outside of the buffer engine.

4. The storage device access controller of claim 1, wherein the plurality of clips includes video, graphics, and audio clips.

5. The storage device access controller of claim 1, wherein the plurality of buffers includes random-access memory (RAM).

6. The storage device access controller of claim 1, wherein the one or more tunable parameters are adjustable by a user via a graphical user interface (GUI).

7. The storage device access controller of claim 1, wherein the one or more tunable parameters includes a number of the plurality of buffers.

8. The storage device access controller of claim 1, wherein the one or more tunable parameters includes a merge distance.

9. The storage device access controller of claim 1, wherein the one or more tunable parameters includes a factor configured for more uniform read sizes.

10. The storage device access controller of claim 1, wherein at least one of the tunable parameters is automatically tunable.

11. The storage device access controller of claim 1, wherein the NLE is networked to another NLE.

12. A buffer engine configured to optimize a data access from a storage device when one or more of a plurality of clips are requested by a non-linear editor (NLE), the buffer engine being configured by one or more tunable parameters to optimize accesses from the storage device, the buffer engine comprising:
a plurality of buffers configured to store data retrieved from the storage device in response to the request from the NLE, wherein at least one of the tunable parameters is used to arrange the plurality of buffers;
a data index for indicating a location of data in a clip on the storage device; and
a reader configured to control the data access from the storage device using the data index in response to at least one of the tunable parameters, wherein the at least one tunable parameter includes a factor to control absorption of a smaller read portion into a larger read portion by defining a minimum data size such that the smaller read portion is absorbed into the larger read portion for the data access when the minimum data size is greater than the smaller read portion.

13. The buffer engine of claim 12, wherein the storage device includes a disk.

14. The buffer engine of claim 12, wherein the data index is stored outside of the buffer engine.

15. The buffer engine of claim 12, wherein the plurality of clips includes video, graphics, and audio clips.

16. The buffer engine of claim 12, wherein the one or more tunable parameters are adjustable by a user via a graphical user interface (GUI).

17. The buffer engine of claim 12, wherein the one or more tunable parameters includes a number of the plurality of buffers.

18. The buffer engine of claim 12, wherein the one or more tunable parameters includes a merge distance.

19. The buffer engine of claim 12, wherein the one or more tunable parameters includes a factor configured for more uniform read sizes.

20. The buffer engine of claim 12, wherein at least one of the tunable parameters is automatically tunable.

21. The buffer engine of claim 12, wherein the NLE is networked to another NLE.

22. The buffer engine of claim 12, wherein the plurality of buffers are configured for a serial access of the data.

23. A method of translating a storage access request for a clip in a storage device, wherein the clip includes a plurality of frames, the method comprising:
accessing one or more tunable parameters to configure a buffer engine for optimizing accesses from the storage device, the buffer engine comprising a plurality of buffers, wherein at least one of the tunable parameters is used to arrange the plurality of buffers in the buffer engine;
detecting a first request to retrieve the clip;
determining a location of frames in the clip on the storage device by accessing an index;
forming a second request to retrieve the clip by merging two or more of the plurality of frames according to at least one of the tunable parameters; and
accessing the storage device in response to the second request and providing the retrieved clip to the buffer engine, wherein the storage device access uses the at least one tunable parameter with a factor to control absorption of a smaller read portion into a larger read portion by defining a minimum data size such that the smaller read portion is absorbed into the larger read portion for the storage device access when the minimum data size is greater than the smaller read portion.

24. The method of claim 23, wherein the detecting includes using a non-linear editor (NLE).

25. The method of claim 23, wherein the accessing the one or more tunable parameters comprises using a graphical user interface (GUI).

26. The method of claim 23, wherein the buffer engine comprises random-access memory (RAM).

27. The method of claim 23, wherein the one or more tunable parameters includes a number of the plurality of buffers in the buffer engine.

28. The method of claim 23, wherein the at least one tunable parameter used in the forming the second request includes a merge distance.

29. The method of claim 23, wherein the one or more tunable parameters includes a factor configured for more uniform read sizes.

30. The method of claim 23, further comprising automatically tuning at least one of the tunable parameters.

31. The method of claim 23, further comprising determining an alignment of sectors for the frames.

32. The method of claim 23, wherein the storage device includes a disk.

33. A computer-readable storage medium including instructions executable by a processor for controlling a storage device access, the computer-readable storage medium being a non-transitory medium comprising one or more instructions adapted to perform the method of claim 23.

* * * * *